United States Patent [19]

Rudolph et al.

[11] Patent Number: 4,741,499
[45] Date of Patent: May 3, 1988

[54] ANTI-ICING SYSTEM FOR AIRCRAFT

[75] Inventors: Peter K. C. Rudolph, Seattle; Douglas L. Bader, Renton, both of Wash.

[73] Assignee: The Boeing Company, Seattle, Wash.

[21] Appl. No.: 687,586

[22] Filed: Dec. 31, 1984

[51] Int. Cl.⁴ .................. B64C 9/24; B64C 21/04; B64D 15/04
[52] U.S. Cl. .................. 244/134 B; 244/207; 244/214
[58] Field of Search .................. 244/134, 207, 214

[56]  References Cited
U.S. PATENT DOCUMENTS

| | | | |
|---|---|---|---|
| 1,750,777 | 3/1930 | Ingram | 244/134 D |
| 2,760,740 | 8/1956 | Brass | 244/134 B |
| 3,917,193 | 11/1975 | Runnels, Jr. | 244/134 B |

FOREIGN PATENT DOCUMENTS

| | | | |
|---|---|---|---|
| 57403 | 1/1953 | France | 244/134 B |
| 330266 | 10/1935 | Italy | 244/134 R |
| 536344 | 5/1941 | United Kingdom | 244/134 B |
| 557905 | 12/1943 | United Kingdom | 244/134 B |

Primary Examiner—Galen Barefoot
Attorney, Agent, or Firm—Hughes & Cassidy

[57] ABSTRACT

A deicing system for leading edges of an aircraft. There is a hot air supply tube extending along the leading edge, a fan to move air through the tube, an electric heater to heat the air that is moved through the tube, and pressure release valves. The hot air is discharged from openings in the tube to spray against the internal surfaces of the wall forming the leading edge. In another embodiment, an electric heater is not used, but there is a compressor which in compressing the air raises the air temperature to accomplish the deicing.

11 Claims, 3 Drawing Sheets

ANTI-ICING SYSTEM FOR AIRCRAFT

BACKGROUND OF THE INVENTION

1. Field of the Invention

The present invention relates to an anti-icing system for an aircraft.

2. Background Art

The anti-icing system most widely used for airfoil leading edges and engine inlets on commercial airplanes utilizes engine compressor bleed air. The system is an on/off type system that is sized by a low power setting idle decent icing condition. The system is oversized for most other conditions and is therefore wasteful. Also, a great portion of the energy bled from the engine is wasted before it reaches its destination. There are bleed port pressure losses, duct pressure losses, temperature reduction due to the pre-cooler under certain conditions, temperature losses in the ducting and the temperature and pressure loss in the spray hole nozzles. Commonly, after the warm air performs its deicing or anti-icing function against the wing leading edge, this air is dumped overboard, and this is another energy loss.

Another disadvantage of the prior art system is that bleed air extraction from the engine causes thrust loss and an increase in specific fuel consumption. With high by-pass engines becoming more efficient, the engine gas generators becomes even smaller so that the bleed air penalties are larger yet. For these and other reasons, various alternative anti-icing systems have been investigated.

One consideration is to use a spray system where a substance such as glycol is sprayed onto the wing surface. However, this has certain drawbacks and then it would require use of a large amount of the deicing material. Also there is the problem of contamination of the wing surface.

Another prior art approach is to use inflatable rubber boots to form the leading edge of the wing. While this approach was widely used for deicing slower propeller airplanes, it generally does not provide a smooth enough surface for a high performance airplane. Also, the boot needs fairly frequent replacement due errosion and aging.

Another approach is to position electric resistance heaters, such as heater blankets, against the inside of the leading edge skin. The problem with this arrangement is the poor conductivity of the thin-air layer between the blanket and the leading edge skin. To heat the wing skin to a safe temperature, the blanket temperature has to be very high.

A search of the patent literature has disclosed a number of deicing systems. These are as follows:

U.S. Pat. No. 1,868,468, Thompson, discloses the use of electric heating elements located in the leading edges of the wings and other aerodynamic components of an airplane to alleviate the problem of these surfaces possibly becoming coated with ice. A rheostat controls the amount of current to the heating elements, and heat from these elements is applied directly to the leading edges.

U.S.Pat. No. 1,943,062, Driscoll, discloses an anti-icing system where a plurality of electrically conductive wires are positioned at spaced locations along the wing surfaces. When moisture, in the form of sleet or ice, begins to form on the wings, electric current will flow from one wire through the sleet or snow to the other wire, so as to melt the sleet, ice or snow and cause it to be removed from the wing.

U.S. Pat. No. 2,304,686, Gregg, shows a deicing system for an aircraft where a coil is placed about the exhaust stack of the aircraft engine so as to absorb heat therefrom. The heat exchange fluid in the coil is then directed through a manifold which is in proximity with the aircraft surfaces which are to be deiced. In another arrangement, there are electric heating coils mounted to the forward portion of the engine cowl. A commutator may be used to cause the flow of current or interrupt the flow of current, as needed, for deicing.

U.S. Pat. No 2,390,093, Garrison, shows a deicing system for an aircraft where the leading edge surface of the wing is made of a porous material (i.e. porous sintered metal plates) through which anti-icing fluid is directed.

U.S. Pat. No. 2,418,205, Taylor, shows a deicing system where the leading edge of the wing is an inflatable structure which can be distorted to break up the ice which forms on the leading edge. The airfoil surfaces immediately rearwardly of the leading edge are stationary surfaces and are heated by other means. One system places heat exchange tubes adjacent the upper and lower surfaces, and a heat exchange medium is directed through these tubes to provide heat and then through return tubes, so as to form a closed loop system. Also electrically conductive heating elements are used to heat these upper and lower surfaces.

U.S. Pat. No. 2,591,757, Young, shows an airfoil where the front spar can be made in sections, and a heating element is provided at the juncture point of the two sections forming the forward part of the spar.

U.S. Pat. No. 2,869,535, Horrell, shows a deicing system where ambient air is drawn into a duct and moved by a fan through a heater, with the air passing from the heater being directed through a passageway at the leading edge of the wing. German patent No. 709,354, shows what appear to be heating tubes disposed in the leading edge of an airfoil.

SUMMARY OF INVENTION

The deicing system of the present invention is adapted for use in an aircraft structure which has a surface member having an exposed surface area upon which ice tends to collect, and which defines an enclosed chamber adjacent thereto.

The system comprises a hot air distribution tube having an inlet. The tube is positioned in the chamber and has outlets to discharge hot air into the chamber so as to be in heat exchange relationship with the surface member.

There is a fan unit having an inlet to receive air from the chamber and to move the air to the inlet portion of the tube. An electric heater is arranged to heat the air which travels through the tube and is discharged in a heat exchange relationship with the surface member.

There is pressure relief valve means communicating between the chamber and an ambient air location. The valve means is arranged to discharge air from the chamber when pressure in the chamber exceeds ambient pressure by a predetermined level, and to admit ambient air into the chamber when pressure in the chamber is below ambient pressure by a predetermined level.

There is power supply and control means adapted to selectively supply power to, and cause operation of, the fan means and the heater, so as to cause heated air to be directed through the distribution tube and in heat exchange relationship with the surface member.

In a preferred embodiment, the aircraft structure comprises a leading edge structure, and the system comprises a modular system which can be inserted in, and removed from, the leading edge structure. In certain forms, the leading edge structure is a movable leading edge device mounted to a main structure, with the system being positioned totally in the leading edge device. Also, in the preferred form, the surface member comprises a skin portion of the leading edge structure. The chamber comprises an elongated duct having a lengthwise axis along the leading edge structure. This elongate duct serves as a return passageway to return air discharged from the tube back to the fan unit.

Preferably, the fan unit is located in an upstream direction, relative to flow of air in the system, from the heater. Thus, the air from the fan unit passes through the heater and then into the spray tube.

The preferred form of the valve means is that there is an outlet valve and an inlet valve. The outlet valve is located in the return duct where the flow velocity is low and thus static pressure is high. The inlet valve which is to admit ambient air into the inlet of the fan unit is located in the venturi section of the inlet, where the flow velocity is high and static pressure is low. The additional ambient air drawn into the system through the inlet valve mixes with the air already in the system downstream of the venturi entrance portion and passes through the fan means.

The total system of the present invention is utilized in an aircraft having a plurality of surface members, each of which has an exposed surface area upon which ice tends to collect. Each deicing unit of the system comprises the components naxed above, namely, the tube, fan unit, electric heater and pressure relief valve means. The control means for the total system is arranged in a manner that at least some of the deicing units can be operated sequentially, thus alleviating total power requirements for the total system. Also, the temperature sensing incorporated assures a thermal input tailored to provide the minimum energy required to do the anti-icing job. That is, at icing conditions with higher ambient temperature, the thermal input will be less, thus avoiding overkill and waste of energy.

In another embodiment of the present invention, the resistance heater is eliminated, and the fan means is provided in the form of a compressor which compresses the air sufficiently to substantially raise the temperature of the air to a deicing temperature. Then this heated compressed air is discharged through the distribution tube so as to be in heat exchange relationship with the surface member. In the preferred form, the pressure ratio of the circulating fan means approaches two to one. In this embodiment, the source of energy for anti-icing is from cooling the electric motor for the fan and from isotropic compression of air.

Other features become apparent from the following detailed description.

DESCRIPTION OF THE PREFERRED EMBODIMENT

Figure 1:
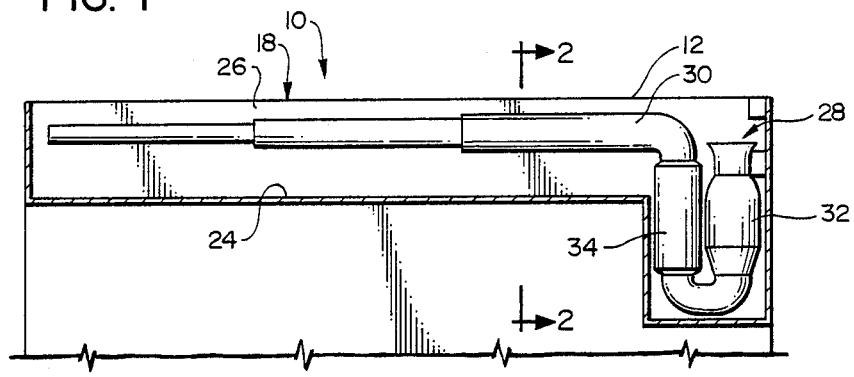
FIG. 1 is a semi-schematic top plan view of a leading edge slat of a wing, incorporating the invention, and showing the upper skin of the slat removed.
Figure 2:
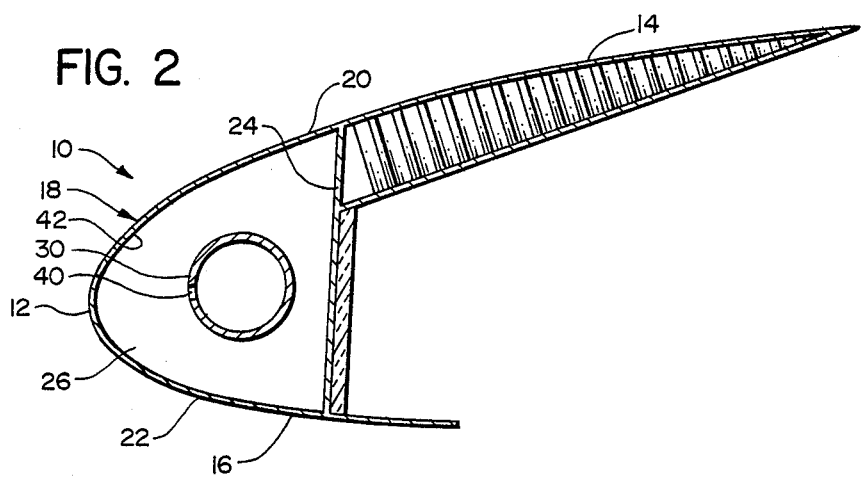
FIG. 2 is a sectional view taken along a chordwise axis of the slat along line 2—2 of FIG. 1.
Figure 3:
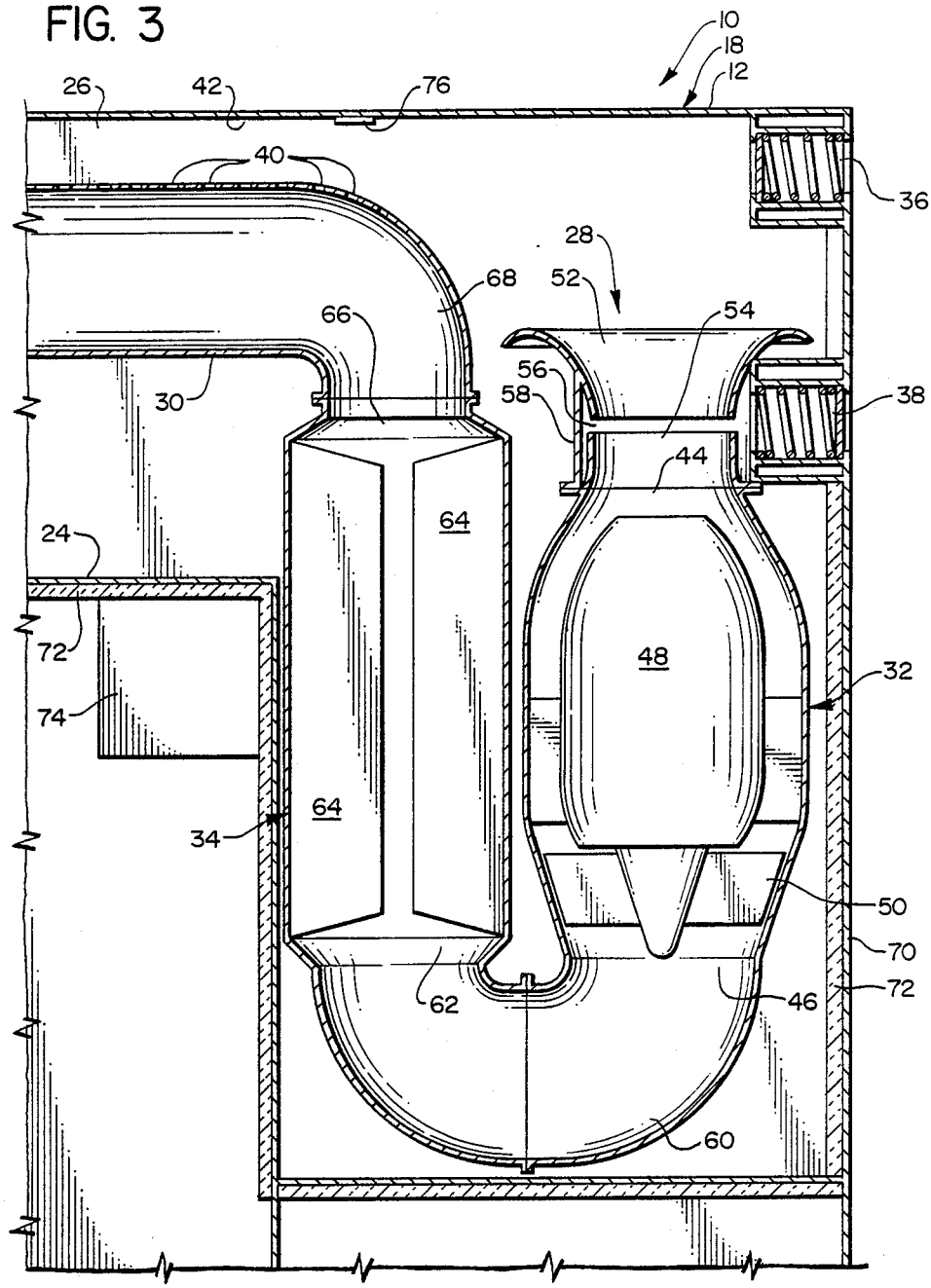
FIG. 3 is a view similar to FIG. 1, but drawn to an enlarged scale and illustrating the components of the anti-icing module in more detail.

In FIG. 1, there is shown a leading edge slat 10 of a wing, said slat having a leading edge 12, an upper surface 14 and a lower surface 16. The slat 10 has a nose structure 18 which is essentially a skin section that forms the leading edge 12 and forward portions 20 and 22 of the upper and lower surfaces 14 and 16, respectively. At the rear of the nose section 18, there is a structural member in the form of a web 24. The nose section 18 and the web 24 collectively define an elongate chamber or duct 26 extending along the entire length of the slat 10.

The deicing system of the present invention, generally designated 28, is shown positioned in the leading edge slat 12. This system 28 comprises a supply tube 30, a fan unit 32, a heater 34 and pressure relief valves 36 and 38.

The supply tube 30 extends substantially the entire length of the duct or chamber 26, and the tube 30 is formed along its length with a plurality of small openings 40 through which hot air is discharged to impinge upon the inner surface 42 of the skin forming the nose structure 18. The arrangement of these openings 40 is such that the distribution of the hot air provides the proper concentration of heat against the nose structure 18.

The fan unit 32 has an inlet 44, an outlet 46, an electric motor 48 and fan blades 50. The inlet 44 has a Venturi-like configuration, where there is a bell shaped entrance 52 leading into a throat 54. The throat 54 is formed with a circumferential slot 56 which opens inwardly in a downstream direction so as to draw surrounding air into and through the slot 56.

The valve 36 is an outlet valve, and the valve 38 is an inlet valve. The inlet valve 38 leads into a circumferential housing 58 that surrounds the slot 56. As will be described in more detail later herein in the description of the operation of the present invention, under circumstances where the pressure in the chamber or duct 26 is below ambient pressure, the relief valve 38 admits ambient air into the housing 58, with this air flowing from the housing 58 inwardly through the slot 56 to be circulated by the fan 32 through the system.

The outlet 46 of the fan 32 leads through a 180 degree tubular connecting section 60 into an inlet end 62 of the heater 34. The heater 34 has a plurality of electric heating elements 64 which heat the air flowing into the inlet end 62, with the heated air passing from an outlet 66 of the heater 34. The heater outlet 66 leads into an inlet end 68 of the supply tube 30.

The pressure relief valve 36 is positioned in the return duct a short distance forwardly of the valve 38, and this valve 36 opens under circumstances where the air pressure within the chamber or duct 26 is above ambient pressure by predetermined pressure difference. The fan 32, heater 34 and valves 36 and 38 are located in a spanwise direction at one end of the slat 10, with the fan unit 32 and heater 34 being positioned in a housing 70 positioned in a chordwise direction a short distance rearwardly of the web 24 of the slat 10. This housing 70 and also the back surface of the web 24 are provided with suitable insulation, as at 72.

To supply electric power to the fan motor 48 and to the heater 34, there is provided a control module, indicated somewhat schematically at 74, with this control module 74 being positioned outside of the chamber or duct 26. A thermo-couple 76 is mounted to the inside surface of the skin that forms the nose structure 18. This thermo-couple 76 is operatively connected to the control module 74 to provide the input for the control module 74 to control the current to the heater 34 and also the operation of the fan unit 32.

To describe the operation of the present invention, let it be assumed that the aircraft to which the slat 10 is mounted is travelling through an icing condition, such as during climb or decent through icing clouds. To remove ice that is formed on the nose structure 18 (or to prevent the formation of such ice), the control module 74 causes current to start the fan unit 32 operating and also power is delivered to the heater 34 to raise the temperature of the heating element 64 to a desired level. The fan unit 32 circulates the air through the heater 34 and then through the supply tube 30. The hot air in the supply tube sprays forwardly in a proper distribution pattern against the inside surface 42 of the nose structure 18, so as to heat the structure 18 and cause removal of the ice or prevention of ice formation. The air discharged from the tube 30 then flows in a spanwise direction through the chamber of duct 26 back to the inlet 44 of the fan 32.

In the event that pressure in the chamber 26 rises above ambient pressure by a certain pressure increment (either due to a temperature increase in the air or possibly a change in altitude), the pressure relief outlet valve 36 responds to permit an outflow of air from the chamber 26. On the other hand, if the pressure in the chamber 26 drops below ambient, then the inlet pressure relief valve 38 responds to permit an inflow of ambient air. As described previously, this ambient air proceeds through the circumferential slot 56 to be circulated through this system by the fan 32.

It can readily be appreciated that the deicing system 28 can be supplied as a modular unit which can readily be installed as a unit in the slat 10, and also be easily removed for replacement or repair. Further, this deicing system 28 can be totally positioned within the slat 10, with the only operative connection to other parts of the airplane being through electric wires to a power source in the airplane.

Figure 4:
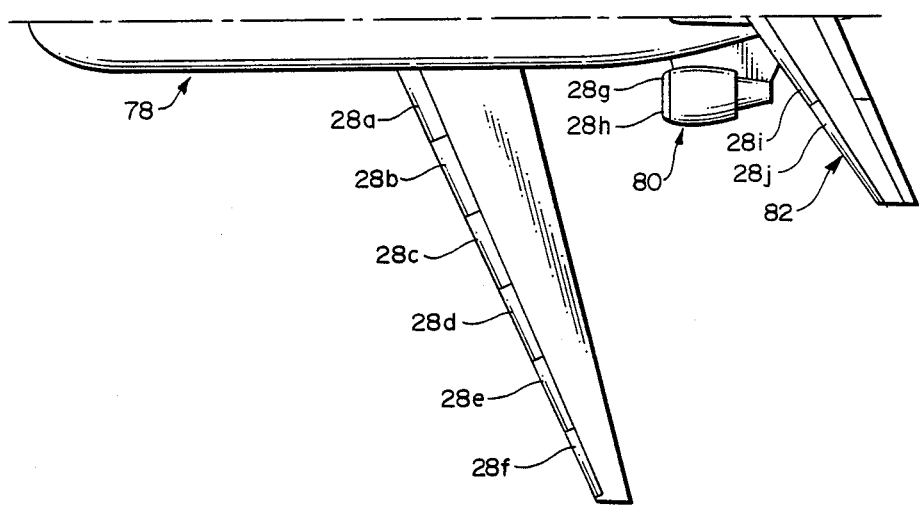
FIG. 4 is a top elevational view of an aircraft, showing only half of the aircraft on one side of the longitudinal center line, and illustrating the locations of the modular units of the present invention.

While the deicing system 28 has been shown mounted to a leading edge slat, it is to be understood that similar modular systems 28 can be installed in other areas of the aircraft. With reference to FIG. 4, there is shown an aircraft 78 having six modular system units 28 (designated 28a–28f) mounted at six locations along the leading edge of the wing, two modular deicing systems (28g and 28h) mounted to the leading edge of an engine cowl 30, and two additional deicing system units (28i and 28j) mounted to the leading edge of a horizontal stabilizer 82.

Another desirable feature of the present invention is that since the deicing system 28 can be provided in the form of a plurality of modular units, it is possible to operate these various deicing units 28a–j in a selected sequential pattern. Thus the units 28a, b, g and h may be operated continuously for anti-icing, while the remaining units 28c–f, 28i and 28j may be operated in a cyclic pattern for deicing. For example, the unit 28c might be operated for one minute to remove an accumulation of ice, and then deactivated for two minutes, while power is delivered sequentially to the units 28d and 28e. This arrangement would insure that adequate power could be supplied to any one unit 28 so that it could properly accomplish the deicing function, but would not require a total output at a level to operate all of the units 28a–j simultaneously.

Figure 5:
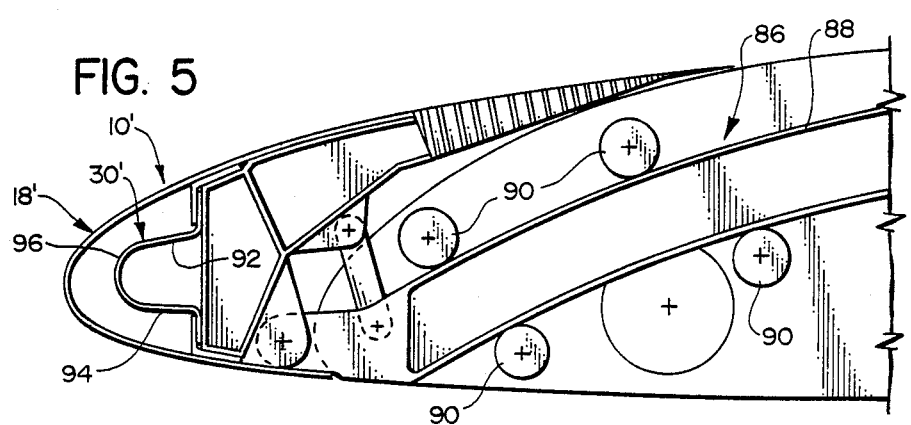
FIG. 5 shows a slightly modified version of the present invention incorporated in a leading edge slat of a wing.

With reference to FIG. 5, there is shown a somewhat modified version of the present invention. FIG. 5 shows the leading edge structure of a wing 84 more completely. There is a leading edge slat 10' having a nose structure 18'. The wing 84 has a track assembly 86 comprising a track 88 and rollers 90, with this track assembly 86 deploying the slat 10' forwardly and downwardly to its extended position.

The supply tube 30' in FIG. 5 is not formed as a cylindrical tube, but rather has a U-shaped configuration, with upper and lower generally planar wall portions 92 and 94, respectively, and a forward semi-circular wall portion 96 joining to the wall portions 92 and 94.

The operation of the modified embodiment shown in FIG. 5 is substantially the same as in the first embodiment, so no detailed description of the second embodiment will be given. This second embodiment lends itself more towards a low pressure system, while the circular supply duct of the first embodiment is more suited for a high pressure system.

Figure 6:
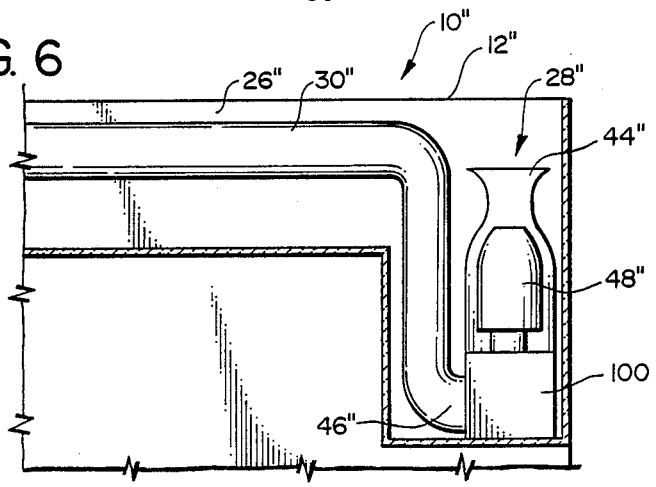
FIG. 6 is a semi-schematic top plan view of a leading edge slat of a wing incorporating a second embodiment, which is a heaterless anti-icing module with high pressure compressor.

A third embodiment of the present invention is illustrated somewhat schematically in FIG. 6. Components of this third embodiment which are similar to components of the first embodiment will be given like numerical designations, with a double prime (") distinguishing those of the third embodiment.

Thus, there is a leading edge slat 10" having an elongate chamber or duct 26" and a deicing system 28". There is a supply tube 30", and an electric motor 48" driving a compressor 100. There is a compressor inlet 44" and an outlet 46" leading to the distribution tube 30".

This second embodiment differs from the first embodiment in that the electric heater is elminated, and the heat supplied to the deicing air is derived from the energy imparted by the compressor 100. The compression ratio of this compressor 100 is sufficiently high (i.e. approaching two to one) so that the air in the tube 30" is at a sufficiently high temperature (e.g. 400° F.) so that when this air is discharged against the surface of the slat 10, it is at an adequate deicing temperature (e.g. 200° F.). Since the motor 48" is located in the path of the air being circulated, the heat from the motor is transferred to this air and is utilized as heat to accomplish the deicing.

It is to be understood that various modifications could be made to the present invention without departing from the basic teachings thereof.

What is claimed is:

1. An electrically powered deicing system for an aircraft structure which has a surface member having an exposed surface area upon which ice tends to collect, and which defines an enclosed chamber adjacent thereto, said system comprising:
  a. a hot air distribution tube means having an inlet portion, said tube means being positioned in said chamber and having outlets to discharge hot air into said chamber so as to be in heat exchange relationship with said surface member,
  b. a fan means having an inlet to receive air from said chamber and to move said air to the inlet portion of the tube means,
  c. an electric heater arranged to heat the air which travels through the tube means and is discharged in heat exchange relationship with the surface member,
  d. pressure relief valve means communicating between said chamber and an ambient air location, said valve means being arranged to discharge air from the chamber when pressure in the chamber exceeds a predetermined pressure level, and to admit ambient air into said chamber when pressure in the chamber is below a predetermined pressure level,
  e. power supply and control means adapted to selectively supply electric power as a main eergy source to, and cause operation of, said fan means and said heater to cause heated air to be directed through said distribution tube means and in heat exchange relationship with the surface member,
  f. wherein said aircraft structure comprising a leading edge structure, and said system comprising a modular system which can be inserted in, and removed from, said leading edge structure,
  g. said leading edge structure being a movable leading edge device mounted to a main structure, and said system being positioned totally in said leading edge device.

2. The system as recited in claim 1, wherein said surface member comprises a skin portion of said leading edge structure, and said chamber comprises an elongate duct having a lengthwise axis along said leading edge structure, said elongate duct serving as a return passageway to return air discharged from the tube means back to the fan means.

3. An electrically powered deicing system for an aircraft structure which has a surface member having an exposed surface area upon which ice tends to collect, and which defines an enclosed chamber adjacent thereto, said system comprising:
  a. a hot air distribution tube means having an inlet portion, said tube means being positioned in said chamber and having outlets to discharge hot air into said chamber so as to be in heat exchange relationship with said surface member,
  b. a fan means having an inlet to receive air from said chamber and to move said air to the inlet portion of the tube means,
  c. an electric heater arranged to heat the air which travels through the tube means and is discharged in heat exchange relationship with the surface member,
  d. pressure relief valve means communicating between said chamber and an ambient air location, said valve means being arranged to discharge air from the chamber when pressure in the chamber exceeds a predetermined pressure level, and to admit ambient air into said chamber when pressure in the chamber is below a predetermined pressure level,
  e. power supply and control means adapted to selectively supply electric power as a main energy source to, and cause operation of, said fan means and said heater to cause heated air to be directed through said distribution tube means and in heat exchange relationship with the surface member,
  f. said valve means comprising an outlet valve and an inlet valve positioned to admit air into the inlet of the fan means, the inlet of the fan means being provided with a venturi entrance portion, with ambient air passing through the inlet valve being drawn into the venturi entrance portion to pass through the fan means.

4. An electrically powered deicing system for an aircraft structure which has a surface member having an exposed surface area upon which ice tends to collect, and which defines an enclosed chamber adjacent thereto, said system comprising:
  a. a hot air distribution tube means having an inlet portion, said tube means being positioned in said chamber and having outlets to discharge hot air into said chamber so as to be in heat exchange relationship with said surface member,
  b. a fan means having an inlet to receive air from said chamber and to move said air to the inlet portion of the tube means,
  c. an electric heater arranged to heat the air which travels through the tube means and is discharged in heat exchange relationship with the surface member,
  d. pressure relief valve means communicating between said chamber and an ambient air location. said valve means being arranged to discharge air from the chamber when pressure in the chamber exceeds a predetermined pressure level, and to admit ambient air into said chamber when pressure in the chamber is below a predetermined pressure level,
  e. power supply and control means adapted to selectively supply electric power as a main energy source to, and cause operation of, said fan means and said heater to cause heated air to be directed through said distribution tube means and in heat exchange relationship with the surface member,
  f. said aircraft structure comprising a leading edge structure, and said system comprising a modular system which can be inserted in, and removed from, said leading edge structure,
  g. said leading edge structure being a moveable leading edge device mounted to a main structure, and said system being positioned totally in said leading edge device,
  h. said surface member comprising a skin portion of said leading edge structure, and said chamber comprising an elongate duct having a lengthwise axis along said leading edge structure, said elongate duct serving as a return passageway to return air discharged from the tube means back to the fan means,
  i. said fan means being located in an upstream direction, relative to flow of air in the system, from the heater, so that air from the fan means passes through the heater and then to the inlet of the tube means,
  j. said valve means comprising an inlet valve positioned to admit air into the inlet of the fan means, the inlet of the fan means being provided with a venturi entrance portion, with ambient air passing through the inlet valve being drawn into the venturi entrance portion to pass through the fan means.

5. An electrically powered deicing system for an aircraft having a plurality of surface members, each of which has an exposed surface area upon which ice tends to collect, with each surface member defining a related enclosed chamber adjacent thereto, said system comprising:

a. a plurality of deicing units, each of said units comprising:
   1. a hot air distribution tube means having an inlet portion, said tube means being positioned in the chamber of a related surface member and having outlets to discharge hot air into said chamber so as to be in heat exchange relationship with its related surface member,
   2. a fan means having an inlet to receive air from said related chamber and to move said air to the inlet portion of the tube means,
   3. an electric heater arranged to heat the air which travels through the tube means and is discharged in heat exchange relationship with this surface member,
   4. pressure relief valve means communicating between said chamber and an ambient air location, said valve means being arranged to discharge air from the chamber when pressure in the chamber exceeds a predetermined pressure level, and to admit ambient air into said chamber when pressure in the chamber is below a predetermined pressure level,
   5. at least some of said surface members being leading edge member, and each deicing unit for the leading edge members comprising a modular unit which can be inserted in, and removed from, said leading edge members.
   6. at least some of surface members being a movable leading edge device mounted to a main structure, with each related modular unit for the leading edge devices being positioned totally in its related leading edge device,
  b. control means adapted to selectively supply power to, and cause operation of, said fan means and said heater of each of said deicing units to cause heated air to be directed selectively through the distribution tube means of selected deicing units
whereby said deicing units can be operated sequentially so as to minimize peak power requirements for the system.

6. The system as recited in claim 5, wherein each of said surface members comprises a skin portion of said leading edge structure, and said chamber comprises an elongate duct having a lengthwise axis along said leading edge structure, said elongate duct serving as a return passageway to return air discharged from the tube means back to the fan means.

7. An electrically powered deicing system for an aircraft having a plurality of surface members, each of which has an exposed surface area upon which ice tends to collect, with each surface member defining a related enclosed chamber adjacent thereto, said system comprising:

a. a plurality of deicing units, each of said units comprising:
   1. a hot air distribution tube means having an inlet portion, said tube means being positioned in the chamber of a related surface member and having outlets to discharge hot air into said chamber so as to be in heat exchange relationship with its related surface member,
   2. a fan means having an inlet to receive air from said related chamber and to move said air to the inlet portion of the tube means,
   3. an electric heater arranged to heat the air which travels through the tube means and is discharged in heat exchange relationship with the surface member,
   4. pressure relief valve means communicating between said chamber and an ambient air location, said valve means being arranged to discharge air from the chamber when pressure in the chamber exceeds a predetermined pressure level, and to admit ambient air into said chamber when pressure in the chamber is below a predetermined pressure level,
   5. said valve means of each deicing unit comprising an outlet valve and an inlet valve positioned to admit air into the inlet of the fan means, the inlet of the fan means being provided with a venturi entrance portion, with ambient air passing through the inlet valve being drawn into the venturi entrance portion to pass through the fan means,
  b. control means adapted to selectively supply power to, and cause operation of, said fan means and said heater of each of said deicing units to cause heater air to be directed selectively through the distribution tube means of selected deicing units
whereby said deicing units can be operated sequentially so as to minimize peak power requirements for the system.

8. An electrically powered deicing system for an aircraft having a plurality of surface membsrs, each of which has an exposed surface area upon which ice tends to collect, with each surface member defining a related enclosed chamber adjacent thereto, said system comprising:

a. a plurality of deicing units, each of said units comprising:
   1. a hot air distribution tube means having an inlet portion, said tube means being positioned in the chamber of a related surface member and having outlets to discharge hot air into said chamber so as to be in heat exchange relationship with its related surface member,
   2. a fan means having an inlet to receive air from said related chamber and to move said air to the inlet portion of the tube means,
   3. an electric heater arranged to heat the air which travels through the tube means and is discharged in heat exchange relationship with the surface member,
   4. pressure relief valve means communicating between said chamber and an ambient air location, said valve means being arranged to discharge air from the chamber when pressure in the chamber exceeds a predetermined pressure level, and to admit ambient air into said chamber when pressure in the chamber is below a predetermined pressure level,
  b. control means adapted to selectively supply power to, and cause operation of, said fan means and said heater of each of said deicing units to cause heated air to be directed selectively through the distribution tube means of selected deicing units, c. at least some of said surface members being leading edge members, and each deicing unit comprising a modular unit which can be inserted in, and removed from, said leading edge structure, d. at least some of said surface members being a movable leading edge device mounted to a main structure, with a related modular unit being positioned totally in said leading edge device, e. each of said surface members comprising a skin portion of said leading edge structure, and said chamber comprising an elongate duct having a lengthwise axis along said leading edge structure, said elongate duct serving as a return passageway to return air discharged from the tube means back to the fan means, f. each of said fan means being located in an upstream direction, relative to flow of air in the system, from the heater, so that air from the fan means passes through the heater and then to the inlet of the tube means, g. said valve means of each deicing unit comprising an outlet valve and an inlet valve positioned to admit air into the inlet of the fan means, the inlet of the fan means being provided with a venturi entrance portion, with ambient air passing through the inlet value being drawn into the venturi entrance portion to pass through the fan means, whereby said deicing units can be operated sequentially so as to minimize peak power requirements for the system.

9. An electrically powered deicing system for an aircraft structure which has a surface member having an exposed surface area upon which ice tends to collect, and which defines an enclosed chamber adjacent thereto, said system comprising:

a. a hot air distribution tube means having an inlet portion, said tube means being positioned in said chamber and having outlets to discharge hot air into said chamber so as to be in heat exchange relationship with said surface member, b. an electrically powered compressor means having an inlet to receive air from said chamber and to compress said air to an extent to cause a sufficient rise in temperature of said air sufficient to accomplish adequate deicing, and then move said air to the inlet portion of the tube means, c. power supply and control means adapted to selectively supply electric power to, and cause operation of, said compressor means to cause heated air to be directed through said distribution tube means and in heat exchange relationship with the surface member to cause said adequate deicing, d. said aircraft structure comprising a leading edge structure, and said system comprising a modular system which can be inserted in, and removed from, said leading edge structure, e. said leading edge structure being a moveable leading edge device mounted to a main structure, said system being positioned totally in said leading edge device.

10. The system as recited in claim 9, wherein said surface member comprises a skin portion of said leading edge structure, and said chamber comprises an elongate duct having a lengthwise axis along said leading edge structure, said elongate duct serving as a return passageway to return air discharged from the tube means back to the fan means.

11. The system as recited in claim 10, wherein said compressor means comprises an electric motor positioned to be in heat exchange relationship with air passing into said tube means, whereby heat generated by said motor is utilized for deicing.

* * * * *